US009846906B1

(12) United States Patent
Acharya et al.

(10) Patent No.: US 9,846,906 B1
(45) Date of Patent: Dec. 19, 2017

(54) DIGITAL BANK BRANCH

(71) Applicant: JPMorgan Chase Bank, N.A., New York, NY (US)

(72) Inventors: Ravi Acharya, Philadelphia, PA (US); Jonathan S. Beck, New York, NY (US); Shawn Morton, Louisville, KY (US); Sih Lee, Northvale, NJ (US)

(73) Assignee: JPMorgan Chase Bank, N.A., New York, NY (US)

( * ) Notice: Subject to any disclaimer, the term of this patent is extended or adjusted under 35 U.S.C. 154(b) by 363 days.

(21) Appl. No.: 13/780,143

(22) Filed: Feb. 28, 2013

(51) Int. Cl.
*G06Q 40/02* (2012.01)
*G06Q 40/00* (2012.01)

(52) U.S. Cl.
CPC ............ *G06Q 40/02* (2013.01); *G06Q 40/00* (2013.01)

(58) Field of Classification Search
CPC .......... G06F 17/3056; G06F 17/30914; G06F 17/30902; G06F 9/542; G06Q 40/00; G06Q 10/10; G06Q 20/042; G06Q 20/1085; G06Q 30/02; G06Q 30/0207; G06Q 30/0283; G06Q 30/06; G06Q 30/0623; G06Q 30/0629; G06Q 40/02; G06Q 20/108; G06Q 20/325; G06Q 40/025
USPC .......................................................... 705/35
See application file for complete search history.

(56) References Cited

U.S. PATENT DOCUMENTS

| 4,264,808 | A | 4/1981 | Owens et al. |
| 4,321,672 | A | 3/1982 | Braun et al. |
| 5,220,501 | A | 6/1993 | Lawlor et al. |
| 5,283,829 | A | 2/1994 | Anderson |

(Continued)

FOREIGN PATENT DOCUMENTS

| WO | WO 2009/140329 | * 11/2009 | ............ G06Q 40/00 |
| WO | WO 2012084020 | 6/2012 | |

OTHER PUBLICATIONS

Calliope & District Community Bank® Branch Newsletter, Dec. 2011. found on the web at http://www.bendigobank.com.au/public/community_bank/pdf/newsletters/calliope/december-2011.pdf.*

(Continued)

*Primary Examiner* — Bijendra K Shrestha
(74) *Attorney, Agent, or Firm* — Goodwin Procter LLP

(57) ABSTRACT

A digital bank branch system is provided for associating a customer communicating over a network with a banking host system with a physical bank branch. The digital bank branch system includes at least one computer memory storing customer information and instructions and at least one computer processor accessing and executing the stored instructions to perform multiple steps. The steps may include associating each customer with a local bank branch, the association accomplished based on at least one of a customer address, a physical customer location and a customer selection of the local bank branch. The system may further provide a local branch information area at a web address, the local branch information area accessible over the network including information relevant to the local bank branch. The system may additionally generate alerts relevant to the local bank branch, select a channel for distribution of the alerts from a plurality of available channels based on the customer information stored in the computer memory, the (Continued)

available channels including at least email, text message, and social media channels; and distribute the alert over the selected channel.

28 Claims, 22 Drawing Sheets

(56) References Cited

U.S. PATENT DOCUMENTS

| | | | |
|---|---|---|---|
| 5,377,261 | A | 12/1994 | Baals et al. |
| 5,404,505 | A | 4/1995 | Levinson |
| 5,408,078 | A | 4/1995 | Campo et al. |
| 5,424,938 | A | 6/1995 | Wagner et al. |
| 5,465,206 | A | 11/1995 | Hilt et al. |
| 5,774,663 | A * | 6/1998 | Randle et al. ............... 709/204 |
| 6,356,555 | B1 | 3/2002 | Rakib et al. |
| 6,633,905 | B1 | 10/2003 | Anderson et al. |
| 7,349,956 | B2 | 3/2008 | Anderson et al. |
| 7,747,702 | B2 | 6/2010 | Anderson et al. |
| 8,320,657 | B1 | 11/2012 | Burks et al. |
| 8,332,319 | B2 | 12/2012 | Pranger |
| 8,351,677 | B1 | 1/2013 | Oakes, III et al. |
| 2003/0217123 | A1 | 11/2003 | Anderson et al. |
| 2009/0235176 | A1* | 9/2009 | Jayanthi ........................ 715/738 |
| 2010/0025463 | A1 | 2/2010 | Daroga |
| 2011/0028160 | A1* | 2/2011 | Roeding et al. ........... 455/456.1 |
| 2011/0314559 | A1* | 12/2011 | Jakobsson ....................... 726/28 |
| 2014/0068000 | A1* | 3/2014 | Maddimsetty ...... H04L 67/2823 709/217 |

OTHER PUBLICATIONS

Vater et al.: The Digital Challenge to Retail Banks, Oct. 17, 2012, Bain Brief, pp. 1-6.*

Fisery Inc.: Snacking, Lunching and Fine Dinning: How Mobile is Reshaping Every Banking Channel, Executive Briefing Paper, Feb. 2012, pp. 1-9.*

* cited by examiner

DIGITAL BANK BRANCH

TECHNICAL FIELD

Embodiments of the invention are related generally to systems and methods for providing remotely accessible banking systems, and more specifically to providing a digital bank branch to enable customers to bank remotely while simultaneously benefiting from the advantages of having a local bank branch.

BACKGROUND OF THE INVENTION

Currently, with increased use of computers including mobile devices such as iPhones, iPads, Android phones, and other devices, remote banking activities have increased in popularity. However, while large banks have been increasing their online offerings to enable customers to engage in transactions remotely, some customers continue to prefer interacting with bank personnel and prefer the familiarity of a local bank branch. A gap currently exists between the online customer experience and the physical in-branch experience.

Online customers are generally unable to directly communicate with bankers and when they do communicate with bankers, the bankers typically are not affiliated with their local branch. Accordingly, customers are further removed from the local branch connection.

Despite the absence of the local branch connection, online interaction offers customers some advantages over the typical in branch experience. Customers avoid waiting in line and avoid traffic jams or other obstacles that they may encounter when traveling to their local bank branch. Furthermore, automated reminders and information in real time provided by the online experience are beneficial to customers.

Currently, most account holders, including those banking at large national banks, are assigned to a home branch. While some customers may visit the home branch, others may be entirely unaware that they are affiliated with a home branch. While some customers appreciate the convenience of banking with a large institution, others may desire the familiarity and friendliness of a more localized smaller bank or credit union. Accordingly, embodiments of the invention provide account holders with information relevant to their home branch to create a personal connection.

Customers are currently using pre-existing social networks to obtain offers relevant to their location. For example, customers using Four Square have to check in to get offers. Thus, they are required to open an application to see if an offer is available. A more proactive solution is needed that will keep customers informed proactively of relevant offers rather than requiring them request offers or information.

Furthermore, many customers associated with a home branch frequently travel and find themselves residing near other branches for extended time periods. Accordingly a need exists for informing customers of their branch options and connecting the customers online with the most convenient branches for them.

Thus, a solution is needed to provide online customers with the familiarity and convenience commonly associated with a local bank branch. Furthermore, a solution is needed for bridging the gap between online and in-person banking experiences by allowing customers a greater connection with a physical branch.

SUMMARY OF THE INVENTION

Embodiments of the invention include a digital bank branch system for associating a customer communicating over a network with a banking host system with a physical bank branch. The digital bank branch system includes at least one computer memory storing customer information and instructions and at least one computer processor accessing and executing the stored instructions to perform multiple steps. The steps include associating each customer with a local bank branch, the association accomplished based on at least one of a customer address, a physical customer location, and a customer selection of the local bank branch. The steps additionally include providing a local branch information area at a web address, the local branch information area accessible over the network including information relevant to the local bank branch and generating alerts relevant to the local bank branch. The steps additionally include selecting a channel for distribution of the alerts from a plurality of available channels based on the customer information stored in the computer memory, the available channels including at least email, text message, and social media channels, and distributing the alert over the selected channel.

In an additional embodiment, a digital bank branch method is provided for associating a customer communicating over a network with a banking host system with a physical bank branch. The digital bank branch method includes storing, in at least one computer memory, customer information and instructions and accessing and executing the stored instructions using at least one computer processor to perform multiple steps. The steps may include associating each customer with a local bank branch, the association accomplished based on at least one of a customer address, a physical customer location, and a customer selection of the local bank branch. The steps may additionally include providing a local branch information area at a web address, the local branch information area accessible over the network including information relevant to the local bank branch and generating alerts relevant to the local bank branch. The steps may further include selecting a channel for distribution of the alerts from a plurality of available channels based on the customer information stored in the computer memory, the available channels including at least email, text message, and social media channels and distributing the alert over the selected channel.

In yet a further embodiment of the invention, a digital bank branch system is provided for associating a customer communicating over a network with a banking host system with a physical bank branch. The digital bank branch system includes at least one computer memory storing customer information and instructions and at least one computer processor accessing and executing the stored instructions to perform multiple steps. The steps include locating a customer based on at least one of an IP address, GPS technology and point of purchase data and providing a selection interface allowing each customer to select multiple local branches. The steps may additionally include associating each customer with at least one local bank branch, the association accomplished based on at least one of the customer selection, a customer address, a physical customer location; and a customer selection of the local bank branch. The steps may further include providing a local branch information area at a web address, the local branch information area accessible over the network including information relevant to the local bank branch, the information including photos and profiles of bankers and branch employees. Additional steps include generating alerts relevant to the local bank branch, selecting a channel for distribution of the alerts from a plurality of available channels based on the customer information stored in the computer memory, the available channels including at least email, text message, and social media channels, and distributing the alert over the selected channel. The steps may further include providing an appointment scheduling interface allowing the customers to select an appointment time and a preferred banker, wherein the scheduled appointments are video appointments. The steps may further include providing a social media sharing option allowing customers to share information displayed through the digital branch system on social media systems, and providing offers to the located customer through the selected channel based on the customer location.

BRIEF DESCRIPTION OF THE DRAWINGS

The present invention is described in detail below with reference to the attached drawings figures, wherein.

DETAILED DESCRIPTION OF PREFERRED EMBODIMENTS

Embodiments of the invention are concerned with the provision of a seamless digital bank branch experience that bridges the gap between the existing online branch and in-branch customer experiences. Embodiments of the invention are integrated with the financial institution website and may be facilitated through the use of mobile applications.

Figure 1:
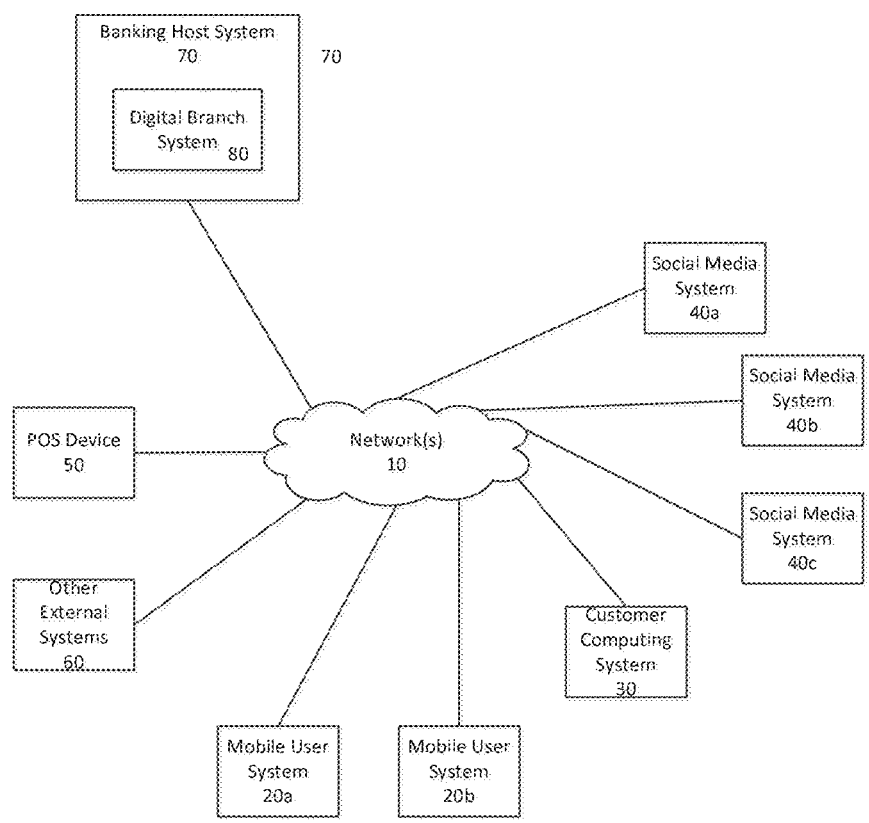
FIG. 1 is a block diagram illustrating an operating environment for a digital bank branch system in accordance with an embodiment of the invention.

FIG. 1 is a block diagram illustrating an operating environment for a digital bank branch system in accordance with an embodiment of the invention. A banking host computing system 70 associated with a digital branch computing system 80 is connected over a network 10 with multiple additional computing systems. The multiple additional computing systems may include, for example, mobile user systems 20a . . . 20b, other customer computing systems 30, social media systems 40a . . . 40c, POS systems and devices 50, and other external systems 60.

The network 10 is preferably the Internet, but may be or include other types of networks. Furthermore, even though only one network is shown, multiple networks may be used. The network 10 may include a wired or wireless local area network (LAN) and a wide area network (WAN), wireless personal area network (PAN) and other types of networks. Computers may be connected over the Internet, an Intranet, Extranet, Ethernet, or any other system that provides communications. Some suitable communications protocols may include TCP/IP, UDP, or OSI for example. For wireless communications, communications protocols may include Bluetooth, Zigbee, IrDa or other suitable protocol. Furthermore, components of the system may communicate through a combination of wired or wireless paths.

The banking host computing system 70 may include computing systems commonly associated with financial institutions, such as account processing systems and credit card processing systems, and further may include the digital branch computing system 80 as further described herein.

The digital branch computing system 80 may provide customers with an online link to a local branch. The digital branch computing system 80 may include computing components such as a computer memory, computer interfaces, and computer processors. The computer processor is capable of accessing data from memory and of accessing and executing programs from memory. The system may provide such features as local branch information. In embodiments of the invention, the digital branch system 80 is accessible through a "My Accounts" web page within a digital branch web site to provide a connection to the home branch. In particular, the area may include photographs, biographical information, and postings from branch personnel. The digital branch computing system 80 may also be tailored to generate information of particular relevance to specific account holders. For example, purchasing history and location information may be used to generate offers or provide information relevant to the particular accountholder. Information may include events, road closures, weather warnings or other items of interest relevant to the branch location. The information may also include branch hours, closures, personnel changes, and other internal information relevant to the branch.

In embodiments of the invention, branch personnel may individually be able to post information through the digital branch computing system 80. The content of the information may be restricted based on the particular position or function of the individual posting. The branch personnel may also be able to use mobile devices and channels in order to post information and retrieve information from the system.

In additional embodiments of the invention, the digital branch system 80 may generate offers that include discounts or coupons relevant to the account holder's current location or to the branch location. The offers may also be based on accountholder purchasing behavior so that they are particularly targeted to the accountholder and will provide repeat business to participating merchants generating the offers.

The digital branch computing system 80 may also enable appointment scheduling with bankers in the local branch. The branch area of the web page provided by the computing system 80 may list the bankers and their areas of expertise so that accountholders can select appropriate personnel. Furthermore, calendar sharing techniques between bank personnel may facilitate scheduling by providing a consolidated calendar for bank personnel with similar functions to enable users to view all times available for scheduling appointments. Accordingly customers may schedule an appointment with a particular banker or with any banker available to perform the desired function. If an accountholder wants to visit the branch without making an appointment, the branch information area of the digital branch computing system 80 may provide information on wait times to see loan officers, to see tellers, or to use the drive-up window.

Because many accountholders travel outside their local area, the digital branch system 80 may provide the opportunity to change a default branch, set a temporary branch, or to add multiple branches. In embodiments of the invention, the digital branch system may determine where the account holder is physically located and may display branch information and generate offers accordingly. Furthermore, account holders may select two branches, for example a "work" branch and a "home" branch and may select hours or dates for display of the relevant branch information. Furthermore, special branches may be provided when a customer cannot be associated with a local branch. For example, a special national branch may be provided. Additionally, multiple branches may be associated with customers who occupy more than one location. For example, retirees who live in Connecticut during the summer may migrate to Florida during the winter. These customers would be provided with online branches in both states. Similarly, members of congress may require branches in their home states as well as in Washington D.C.

Additionally, the content within the information section of the digital branch system 80 may be tailored for sharing on networking sites, such as Twitter™, Facebook™, or LinkedIn™. Through the use of sharing, other social media users may become aware of the utility of the branch area on financial institution web sites. The digital branch system may also be connected with social media systems such as Four Square and may use the check-in information to generate offers and information through the digital branch system 80. However, in other embodiments, the system may use other techniques to determine a user's location. For example, the system may determine the location based data received from the user's smartphone. Alternatively, the system may determine the user's location based on a credit card approval requested from a POS location. Merchants may agree to participate in the system by providing detailed purchase information to the digital branch system. With the use of this information, the system will be better able to target offers and coupons to benefit both accountholders and merchants.

Additionally, updates, alerts, information, and offers generated by the digital branch system 80 may be provided through any of various channels, such as text, social media, the digital branch section of the financial institution web page, email, or other channel. In embodiments of the invention, the customer may select the channel or channels through the digital branch system. Furthermore, the system 80 may detect use of a particular device or application on the device and send information in a manner most likely to be received in real time.

The multiple additional computing systems connected over the network 10 may include, for example, mobile user systems 20*a* . . . 20*b*. The mobile computing devices 20*a* . . . 20*n* preferably store a mobile digital branch application that interfaces with the digital branch computing system 80. The computing devices 20*a* . . . 20*n* may be or include any personal computing device such as a laptop or desktop computing device or handheld mobile devices with internet access, such as iPhones™ or other mobile phones, iPads™ or tablets, or any other known mobile devices. In embodiments of the invention, the mobile devices may be equipped with cameras for photo identification purposes, and may also be equipped with features for facilitating biometric identification.

Other customer computing systems 30 may include desktop or other types of computing devices that may be used by customers including both business and personal customers.

Social media systems 40*a* . . . 40*c* may include computing devices that host the social media sites described above, such as Four Square™, Facebook™, LinkedIn™, etc. The digital branch system 80 can allow users to share branch information through these sites.

POS (point of sale) systems and devices 50 may include POS terminals located in merchant establishments and any connected systems. When these systems process purchases, the information captured can have various uses, such as locating the customer and ascertaining customer preferences.

Other external systems 60 may include merchant systems or any other systems that may benefit from linking to the digital branch system 80. For example, merchants may analyze data collected from the digital branch system 80 in order to make tailored offers to digital branch customers.

Figure 2:
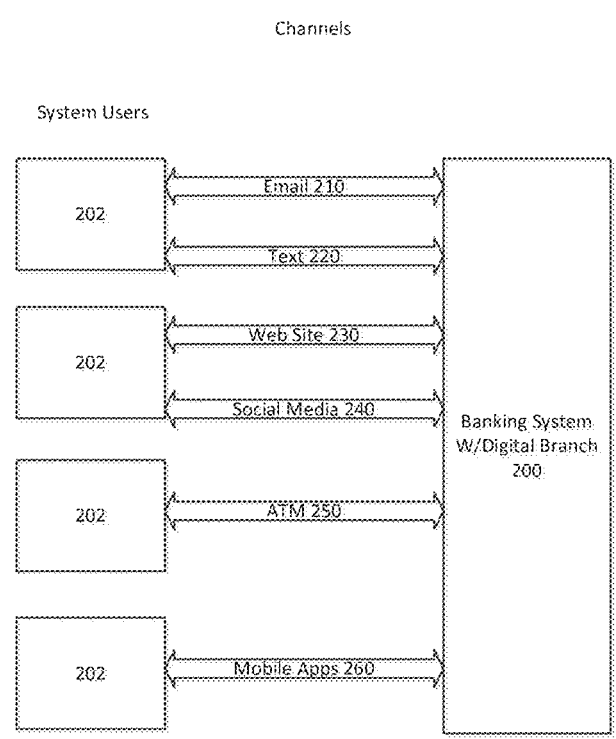
FIG. 2 is a block diagram illustrating interaction with distribution channels in accordance with an embodiment of the invention.

FIG. 2 is a block diagram illustrating interaction of a digital branch system 200 with system users 202. In the displayed embodiment, system users 202 are generally intended to represent account holders using mobile devices or other computing devices, but may also encompass any of the entities connected over the network as illustrated in FIG. 1. The digital branch system 200 communicates and interacts with the system users 202 over a plurality of distribution channels in accordance with an embodiment of the invention.

The illustrated distribution channels include email channels 210, text channels 220, website 230, social media 240, ATM 250, and mobile apps 260. The digital branch system may determine an appropriate communication channel based on a number of factors. First, the digital branch system may choose to respond in kind. When a user accesses the system over the digital branch website, the digital branch website may, for example, engage in chat with the user over the website. When a user texts the system, the system may text the user in response. Alternatively, the digital branch system may offer a selection interface allowing users to select a preferred channel for interaction. In embodiments of the invention, users may select more than one channel for interaction. Furthermore, the user may connect with the digital branch system over one or more of the displayed channels and receive information and notifications over different channels if desired.

Figure 3:
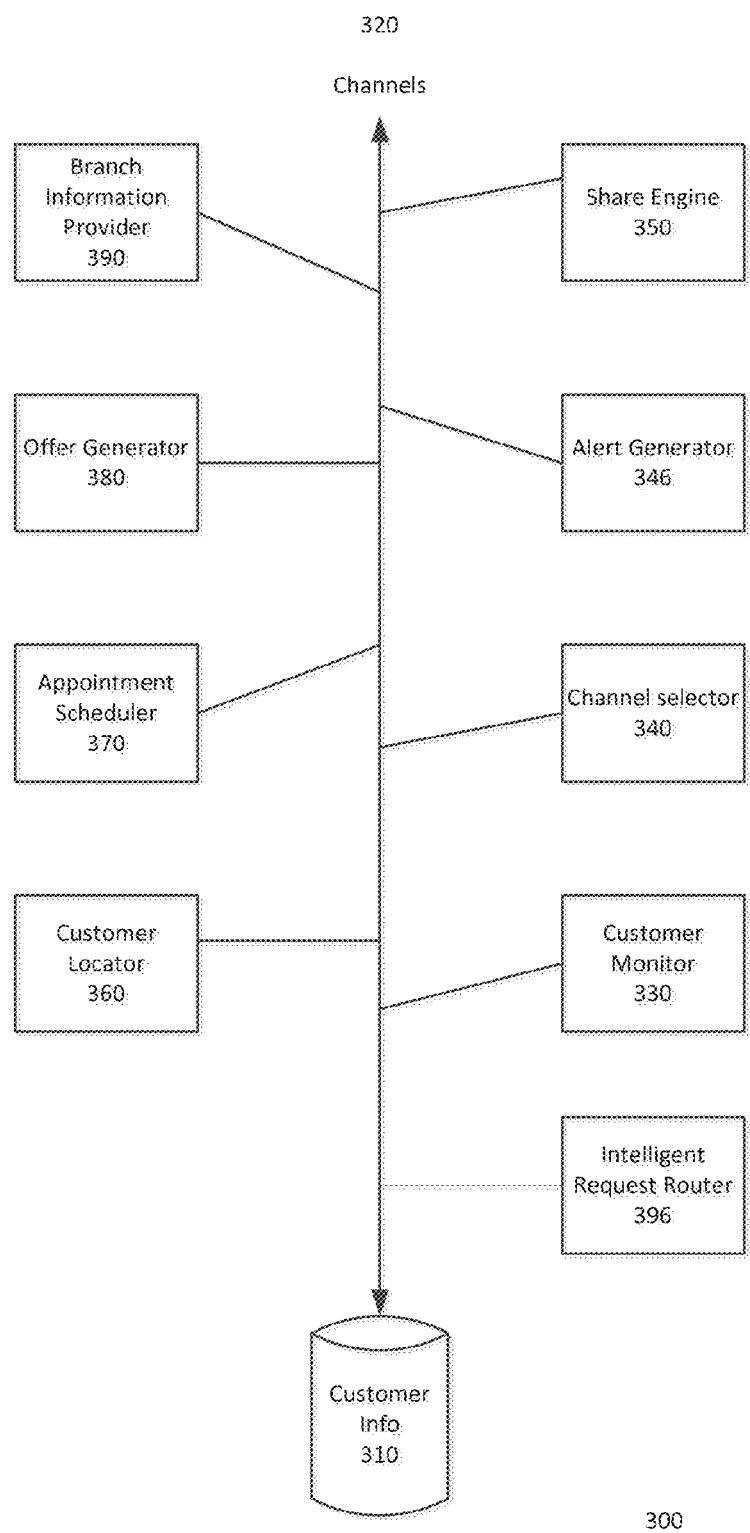
FIG. 3 is a block diagram illustrating components of a digital branch computing system in accordance with embodiments of the invention.

FIG. 3 is a block diagram illustrating components of a digital branch computing system in accordance with embodiments of the invention. The digital branch system 300 may receive and process customer information 310, which may be stored in a memory for future use, and may communicate with customers over various channels 320. The digital branch computing system 300 may include a processor for executing multiple applications including a customer monitor 330, a channel selector 340, an alert generator 346, a share engine 350, a customer locator 360, an appointment scheduler 370, an offer generator 380, and a branch information provider 390. Additional or fewer applications may be provided and in embodiments of the invention and applications may be combined.

The customer monitor 330 may communicate with POS devices, various account systems, merchant web sites, social media sites and other resources to monitor user behavior. User behavior may include, for example, purchasing behavior, browser behavior, and social media behavior, such as "likes" on Facebook™. The customer monitor 330 may interact the offer generator 380 in order to tailor offers to participating customers.

The channel selector 340 determines the channel through which the digital branch system 300 will interact with each user. As set forth above, a number of options exist for channel determination. The user can be asked to pre-select preferred channels and if no channels are pre-selected, the system may revert to default channels. In embodiments of the invention, the customer may select different channels for different accounts. Alternatively, the system may select the channel based on the nature of the information to be communicated. An account alert to notify a user of expenditures may require a "real time" channel. The customer monitor 330 may be able to determine if the customer is using a particular device or communication mode and may inform the channel selector 340 so that it can determine an appropriate channel, based on the device the customer is currently using for communication.

The alert generator 346 generates alerts for transmission over the selected channel. The alerts 346 may include branch information, appointment information, road closure alerts, or user account information. Other information may also be included.

The share engine 350 provides the user with an opportunity to share branch information over social media channels. In embodiments of the invention, a "share" button is placed on the digital branch system interface and may be selected by users to share relevant information through social media sites.

The customer locator 360 may operate to physically locate a customer. The customer locator 360 may determine through purchasing behavior, through GPS or other geolocation technology, or through customer communications, the geographic location of the customer. The customer locator may relay its findings to the offer generator 380 so that geographically relevant offers can be generated.

The appointment scheduler 370 operates to allow account holders to interact the digital branch system to schedule appointments with local bankers. While in some embodiments of the invention, the scheduled appointments may be in-person, in other embodiments, the appointments may be web appointments or video appointments. The appointment scheduler 370 may provide a calendar area for each listed banker so that customers can determine availability in order to schedule.

For customers with an assigned banker, the appointment scheduler 370 may allow the customer to view banker calendars (free/busy only) and schedule an appointment. For customers without an assigned banker, or prospective customers, the system may provide an appointment capability using a generic branch calendar. Alternatively, customers can select type of banker to meet with e.g. personal banker, business banker, loan officer, financial advisor, or private client banker In embodiments of the invention, this capability is available in all channels (mobile, web, call center etc). The customer may also have the option to receive an appointment reminder (text, Email, or phone). This functionality may be integrated with the branch calendar.

The appointment scheduler 370 may also have ad hoc scheduling functionality. For example, a customer may communicate with the system to request an agent call at a specific time. Thus, a customer may send a text message to a phone number provided by the digital branch system requesting that an agent call the customer at 3 PM. In response, the system may route the request to an appropriate agent for fulfillment. Scheduled meetings could be in person meetings phone meetings, video, or web meetings. Text messaging is used merely as an example as other methods of transmission may also be used.

The appointment scheduler 370 may also operate to perform integrated scheduling for pre-staged transactions rather than banker meetings. Customers may be able to obtain a credit card, a cashiers's check or other items provided by the bank by scheduling pick-up at a bank branch through the appointment scheduler 370. In embodiments of the invention, the appointment scheduler may cooperate with the customer locator 360 in order to determine the most convenient bank branch for customer pick-up. For example, a customer may use his mobile device to email or text the system and schedule a time for pick-up. In embodiments of the invention, pick-up could occur through a drive-through teller window.

Customers can access appointment scheduling capability from the website provided by the digital branch computing system, but may also access appointment scheduling through mobile or other applications in both public and private environments. Any customer with the capability to review a screen can schedule appointments with bankers. The provided screen preferably includes a form to capture date, time, appointment reason, notes, and customer contact details, etc. If an accountholder wants to visit the branch without making an appointment, the digital branch system may provide information on wait times to see loan officers, to see tellers, or to use the drive-up window. Operations of the appointment scheduler 370 are further described below with reference to FIGS. 8A-8D.

The offer generator 380 may operate in conjunction with merchants local to each branch or geographically distributed merchants in order to generate offers that will be geographically relevant to the customers. Accordingly, offers from merchants may be received and stored by the system and may be generated when appropriate based on information collected by the customer locator and the customer monitor 330. For example, the customer monitor 330 may determine the customer frequents Mexican restaurants and the customer locator 360 may determine the current location of the customer. In response, the offer generator 380 may generate an offer for a Mexican restaurant near the location found by the customer locator 360.

The branch information provider 390 may provide a dedicated area on the account information page that displays content, tools and information regarding the customer's local branch updates. Preferably, the branch information provider 390 also provides an area where content can be posted by the branch staff or on behalf of the branch staff. This section may include a text update with a headline and short text description. Updates can also include a link/URL and a photo or caricature of the branch staff member posting the update. Further, the updates can be accompanied by a name and title of branch staff member posting the update. The branch information provider 390 may also provide a branch information area that may include: a branch photograph; branch address; branch contact information; branch hours; open or closed status; and a link for changing a default branch. The branch information provider should also provide a link to access the appointment scheduler.

Customers must have the ability to change their default branch from the branch information area. For example, selecting a "Change my branch" link in the branch information area may spawn a modal window that allows the customer to find branches by zip code or city/state. Upon selecting a new default branch, the modal window closes and the branch information area is updated with the new branch information. Customers may want to change a branch when they relocate or travel for extended periods of time. Alternatively, the customer may simply want to add additional branches if the customer's relocation is temporary or seasonal.

The branch information provider 390 may also include a branch locator section to assist customers in locating a convenient branch. The branch locator section should enable customers to designate any branch as a default branch by selecting a "Make my default branch" link. The branch information provider 390 may also provide loan officer locator functionality to enable customers to find an appropriate loan officer. After finding a loan officer, customers can access the above-described appointment scheduler in order to schedule time with the located loan officer.

The intelligent request router 396 may be operative to receive customer requests and to direct them appropriately. The intelligent request router 396 may integrate its functionality with the aforementioned components. For example, the intelligent request router 396 may interact with the appointment scheduler 370 to ensure that the appointments are scheduled with appropriate personnel at an appropriate location where issues raised by the customer can be effectively handled. Different problems or issues may require specific expertise and the intelligent request router 396 can match the request with the expertise and redirect the customer The intelligent request router 396 finds in intersection between customer needs and bank personnel with an appropriate skill set. Furthermore the intelligent request router 396 may interact with the customer locator 360 to ensure that requests are routed in a geographically convenient manner. The intelligent request router may also evaluate the channel or mode of connectivity desired as well as availability of branch personnel.

The components described above may include software components including instructions executed by one or more computer processors to perform the functions described. The components may include or access databases stored in computer memory to obtain data necessary for execution of instructions. Databases may be provided and accessed both within financial services computing systems and outside of the financial services organization Accordingly, as will be described further below in association with the attached screen shots, the system and method of the invention serve to increase awareness and engagement with physical branch improve efficiency of appointment scheduling between a financial institution and its customers. The user interfaces described below may be provided through the mobile devices or other computing devices to guide system users through various processes supported by the digital branch system.

All of the components shown in FIGS. 1-3 above may be, include, or be implemented by a computer or multiple computers. The system of the invention or portions of the system of the invention may be in the form of a "processing machine," i.e. a tangibly embodied machine, such as a general purpose computer or a special purpose computer, for example. As used herein, the term "processing machine" is to be understood to include at least one processor that uses at least one memory. The at least one memory stores a set of instructions. The instructions may be either permanently or temporarily stored in the memory or memories of the processing machine. The processor executes the instructions that are stored in the memory or memories in order to process data. The set of instructions may include various instructions that perform a particular task or tasks, such as any of the processing as described herein. Such a set of instructions for performing a particular task may be characterized as a program, software program, or simply software.

As noted above, the processing machine, which may be constituted, for example, by the particular system and/or systems described above, executes the instructions that are stored in the memory or memories to process data. This processing of data may be in response to commands by a user or users of the processing machine, in response to previous processing, in response to a request by another processing machine and/or any other input, for example. As noted above, the processing machine used to implement the invention may be a general purpose computer. However, the processing machine described above may also utilize (or be in the form of) any of a wide variety of other technologies including a special purpose computer, a computer system including a microcomputer, mini-computer or mainframe for example, a programmed microprocessor, a micro-controller, a peripheral integrated circuit element, a CSIC (Customer Specific Integrated Circuit) or ASIC (Application Specific Integrated Circuit) or other integrated circuit, a logic circuit, a digital signal processor, a programmable logic device such as a FPGA, PLD, PLA or PAL, or any other device or arrangement of devices that is capable of implementing the steps of the processes of the invention.

The processing machine used to implement the invention may utilize a suitable operating system. Thus, embodiments of the invention may include a processing machine running the Microsoft Windows™ Vista™ operating system, the Microsoft Windows™ XP™ operating system, the Microsoft Windows™ NT™ operating system, the Windows™ 2000 operating system, the Unix operating system, the Linux operating system, the Xenix operating system, the IBM AIX™ operating system, the Hewlett-Packard UX™ operating system, the Novell Netware™ operating system, the Sun Microsystems Solaris™ operating system, the OS/2™ operating system, the BeOS™ operating system, the Macintosh operating system, the Apache operating system, an OpenStep™ operating system or another operating system or platform.

It is appreciated that in order to practice the method of the invention as described above, it is not necessary that the processors and/or the memories of the processing machine be physically located in the same geographical place. That is, each of the processors and the memories used by the processing machine may be located in geographically distinct locations and connected so as to communicate in any suitable manner. Additionally, it is appreciated that each of the processor and/or the memory may be composed of different physical pieces of equipment. Accordingly, it is not necessary that the processor be one single piece of equipment in one location and that the memory be another single piece of equipment in another location. That is, it is contemplated that the processor may be two pieces of equipment in two different physical locations. The two distinct pieces of equipment may be connected in any suitable manner. Additionally, the memory may include two or more portions of memory in two or more physical locations.

To explain further, processing as described above is performed by various components and various memories. However, it is appreciated that the processing performed by two distinct components as described above may, in accordance with a further embodiment of the invention, be performed by a single component. Further, the processing performed by one distinct component as described above may be performed by two distinct components. In a similar manner, the memory storage performed by two distinct memory portions as described above may, in accordance with a further embodiment of the invention, be performed by a single memory portion. Further, the memory storage performed by one distinct memory portion as described above may be performed by two memory portions.

Further, various technologies may be used to provide communication between the various processors and/or memories, as well as to allow the processors and/or the memories of the invention to communicate with any other entity; i.e., so as to obtain further instructions or to access and use remote memory stores, for example. Such technologies used to provide such communication might include a network, the Internet, Intranet, Extranet, LAN, an Ethernet, or any client server system that provides communication, for example. Such communications technologies may use any suitable protocol such as TCP/IP, UDP, or OSI, for example.

As described above, a set of instructions is used in the processing of the invention. The set of instructions may be in the form of a program or software. The software may be in the form of system software or application software, for example. The software might also be in the form of a collection of separate programs, a program module within a larger program, or a portion of a program module, for example. The software used might also include modular programming in the form of object oriented programming. The software tells the processing machine what to do with the data being processed.

Further, it is appreciated that the instructions or set of instructions used in the implementation and operation of the invention may be in a suitable form such that the processing machine may read the instructions. For example, the instructions that form a program may be in the form of a suitable programming language, which is converted to machine language or object code to allow the processor or processors to read the instructions. That is, written lines of programming code or source code, in a particular programming language, are converted to machine language using a compiler, assembler or interpreter. The machine language is binary coded machine instructions that are specific to a particular type of processing machine, i.e., to a particular type of computer, for example. The computer understands the machine language.

Any suitable programming language may be used in accordance with the various embodiments of the invention. Illustratively, the programming language used may include assembly language, Ada, APL, Basic, C, C++, COBOL, dBase, Forth, Fortran, Java, Modula-2, Pascal, Prolog, REXX, Visual Basic, and/or JavaScript, for example. Further, it is not necessary that a single type of instructions or single programming language be utilized in conjunction with the operation of the system and method of the invention. Rather, any number of different programming languages may be utilized as is necessary or desirable.

Also, the instructions and/or data used in the practice of the invention may utilize any compression or encryption technique or algorithm, as may be desired. An encryption module might be used to encrypt data. Further, files or other data may be decrypted using a suitable decryption module, for example.

As described above, the invention may illustratively be embodied in the form of a processing machine, including a computer or computer system, for example, that includes at least one memory. It is to be appreciated that the set of instructions, i.e., the software for example that enables the computer operating system to perform the operations described above may be contained on any of a wide variety of media or medium, as desired. Further, the data that is processed by the set of instructions might also be contained on any of a wide variety of media or medium. That is, the particular medium, i.e., the memory in the processing machine, utilized to hold the set of instructions and/or the data used in the invention may take on any of a variety of physical forms or transmissions, for example. Illustratively, the medium may be in the form of paper, paper transparencies, a compact disk, a DVD, an integrated circuit, a hard disk, a floppy disk, an optical disk, a magnetic tape, a RAM, a ROM, a PROM, a EPROM, a wire, a cable, a fiber, communications channel, a satellite transmissions or other remote transmission, as well as any other medium or source of data that may be read by the processors of the invention.

Further, the memory or memories used in the processing machine that implements the invention may be in any of a wide variety of forms to allow the memory to hold instructions, data, or other information, as is desired. Thus, the memory might be in the form of a database to hold data. The database might use any desired arrangement of files such as a flat file arrangement or a relational database arrangement, for example.

In the system and method of the invention, a variety of "user interfaces" may be utilized to allow a user to interface with the processing machine or machines that are used to implement the invention. As used herein, a user interface includes any hardware, software, or combination of hardware and software used by the processing machine that allows a user to interact with the processing machine. A user interface may be in the form of a dialogue screen for example. A user interface may also include any of a mouse, touch screen, keyboard, voice reader, voice recognizer, dialogue screen, menu box, list, checkbox, toggle switch, a pushbutton or any other device that allows a user to receive information regarding the operation of the processing machine as it processes a set of instructions and/or provide the processing machine with information. Accordingly, the user interface is any device that provides communication between a user and a processing machine. The information provided by the user to the processing machine through the user interface may be in the form of a command, a selection of data, or some other input, for example.

As discussed above, a user interface is utilized by the processing machine that performs a set of instructions such that the processing machine processes data for a user. The user interface is typically used by the processing machine for interacting with a user either to convey information or receive information from the user. However, it should be appreciated that in accordance with some embodiments of the system and method of the invention, it is not necessary that a human user actually interact with a user interface used by the processing machine of the invention. Rather, it is also contemplated that the user interface of the invention might interact, i.e., convey and receive information, with another processing machine, rather than a human user. Accordingly, the other processing machine might be characterized as a user. Further, it is contemplated that a user interface utilized in the system and method of the invention may interact partially with another processing machine or processing machines, while also interacting partially with a human user.

Figure 4A:
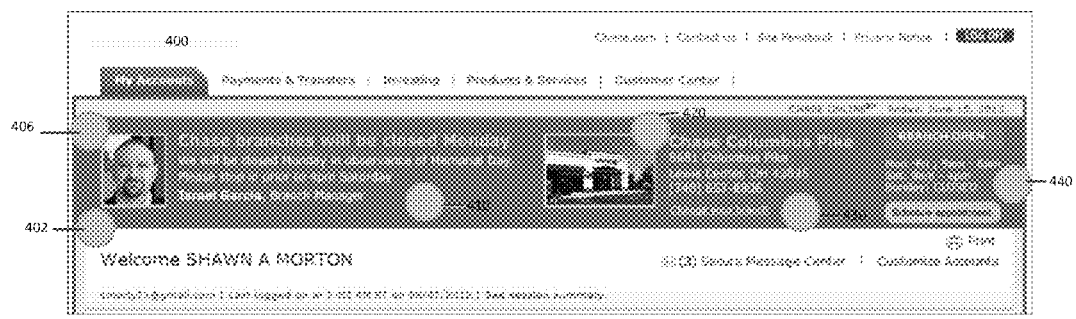
FIGS. 4A and 4B are screen shots illustrating a digital branch system information interface in accordance with an embodiment of the invention.

FIG. 4A is user interface 400 illustrating an account information section as provided by the branch information provider of the digital branch system. As set forth above, this section may include a persistent branch area 402 and a banker information area 406 including photos of the banker and/or branch. The account information page 400 may also include basic status updates 410 from the branch. The basic status updates 410 may include information about branch hours or other events. Branch information 420 may also be provided and preferably includes the address, phone number, branch hours, and open or closed status of the branch. A link 430 may be provided to allow customers to change the default branch if the branch selected for them is not convenient. Another link 440 may be provided for appointment scheduling in order to allow customers to view a calendar and schedule an appointment with a banker.

Figure 4B:
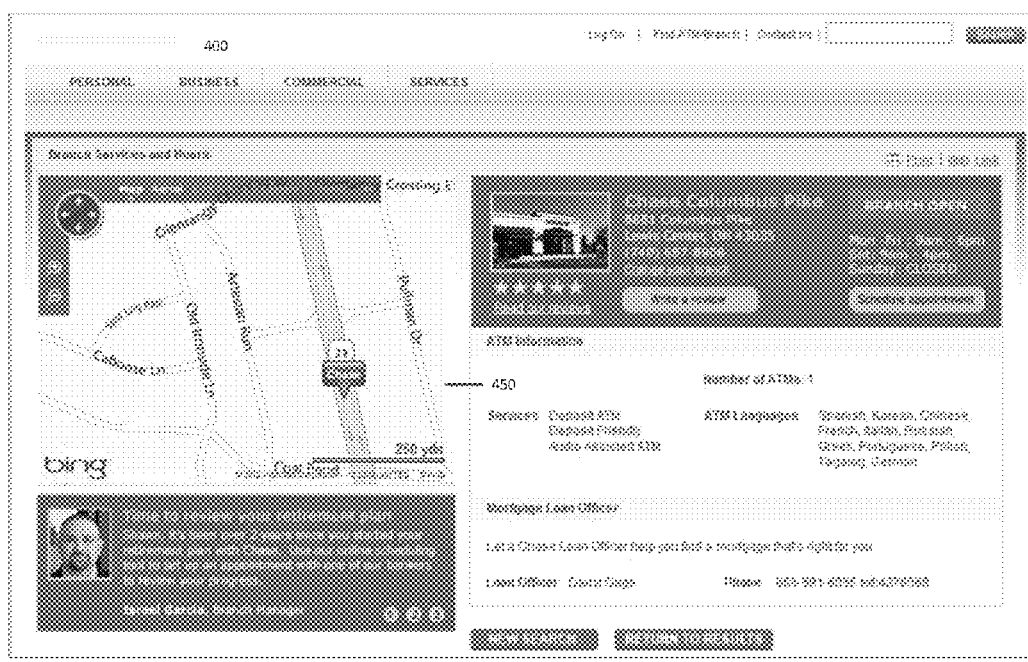

FIG. 4B illustrates a user interface 400 including locator integration 450. The locator integration feature preferably is provided on branch locator pages for each branch.

Figure 5:
FIG. 5 is a user interface illustrating a further digital branch information interface in accordance with an embodiment of the invention.

FIG. 5 is a user interface 500 illustrating a further digital branch information interface in accordance with an embodiment of the invention. FIG. 5 illustrates a rotating branch area 510 in which status updates rotate between multiple panels to show more updates without increasing the required screen space. The interface 500 also includes branch specific updates 520 that may contain additional content types such as photos and video. Sharing integration 530 is also provided to integrate Facebook, Twitter, and "add to calendar" functionality. Other links 540 allow customers to read and write branch reviews. Other provided features may allow customers to subscribe to updates via email, RSS, or other channels.

Figure 6:
FIG. 6 is a user interface illustrating a further digital branch information interface in accordance with an embodiment of the invention.

FIG. 6 is a user interface 600 illustrating a further digital branch information interface 600 in accordance with an embodiment of the invention. The user interface 600 preferably includes customer-specific updates 610. The customer-specific updates may target content based on data collected about each individual customer. The content can include, for example, promotions, reminders, and merchant-funded offers. The interface may additionally include an appointment scheduling option 620 to support video appointments for pre-determined types of interaction. The interface may also include preference management options 630 for allowing customers to manage content, offer, and sharing preferences.

Figure 7A:
FIGS. 7A-7C are user interfaces illustrating a method for changing a local branch in accordance with an embodiment of the invention.
Figure 7B:
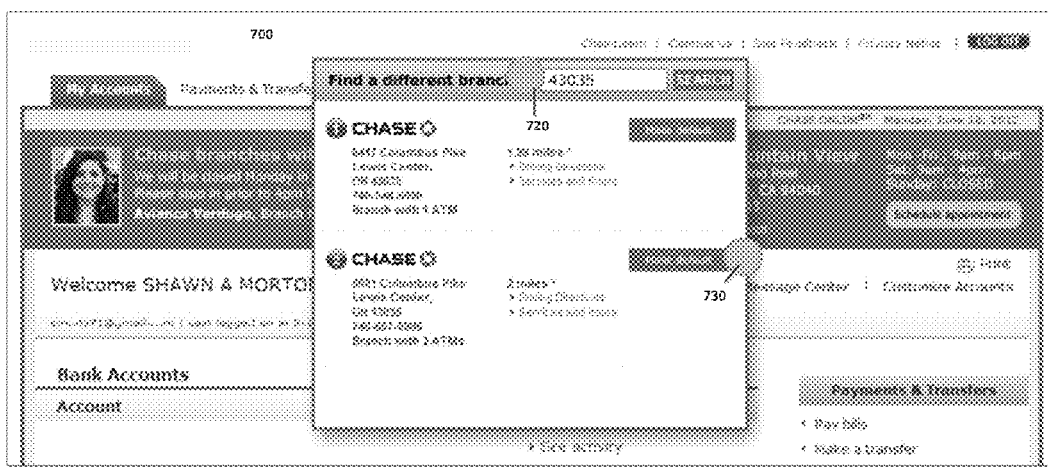
Figure 7C:

FIGS. 7A-7C are user interfaces illustrating a method for changing a local branch in accordance with an embodiment of the invention. In FIG. 7A, a user interface 700 offers a branch changing options 710. By selecting the option 710, a user may change his or her default branch. In FIG. 7B, the user interface 700 allows the user selecting the branch changing option to select branch locator functionality 720. Using this functionality, the user can locate a branch based on zip code, city, or state. Once the customer has located the desired branch, a selectable option 730 allows the customer to make the located branch the default branch. In FIG. 7C, the interface 700 shows that the branch information area 740 has refreshed upon selection of new branch as the default branch.

Figure 8A:
FIGS. 8A-8D are user interfaces illustrating an appointment scheduling method in accordance with an embodiment of the invention.
Figure 8B:
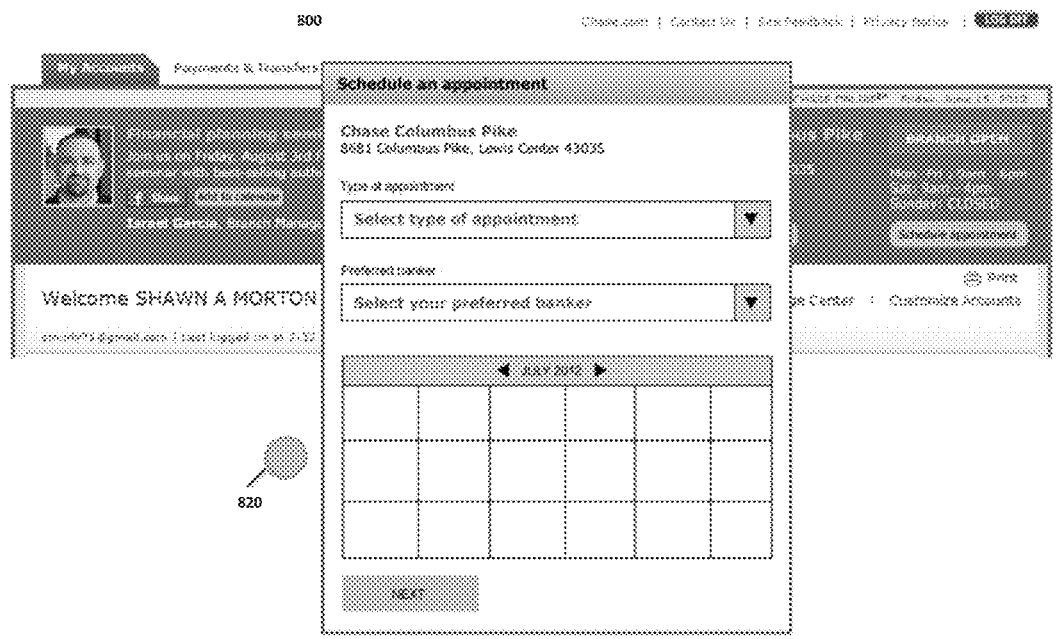
Figure 8C:
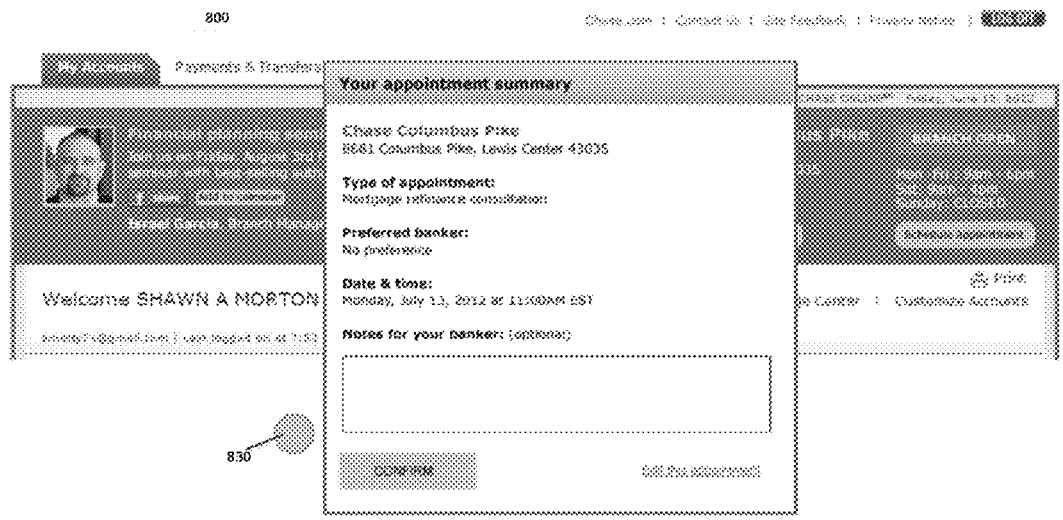
Figure 8D:

FIGS. 8A-8D are user interfaces 800 illustrating an appointment scheduling method in accordance with an embodiment of the invention. In FIG. 8A, a user may select the appointment scheduling option 810 in the branch information section. FIG. 8B illustrates an appointment scheduling interface 820 that allows selection of the type of appointment, preferred banker, and desired date and time. After selection of appointment details, the interface of FIG. 8C may provide an appointment summary 830 that allows a customer to review appointment details and add any notes that are relevant for use by the banker. FIG. 8D illustrates an appointment confirmation interface 800 that incorporates an "add to calendar" feature 840. The add to calendar feature may allow customers to add a reminder to a calendar, such as an Outlook™, iCal™, or Google™ Calendar.

In embodiments of the method, the digital branch system pre-populates the appointment screen with customer contact details in the appointment form. Customers having assigned bankers may be able to view the assigned banker's free/busy time from a calendar such as Outlook and schedule an appointment accordingly. If customers have an assigned banker, but want to schedule time with a different banker, these customers may be permitted to choose an appointment time from a generic calendar at the assigned branch. For customers without an assigned banker, the system may also provide an option to use generic assigned branch calendar. Customers without an assigned branch, may be automatically defaulted to the branch selector to search for an available appointment. Even if customers have an assigned branch, the customers may be permitted to choose a different branch location's generic calendar and schedule an appointment. For non-customers and customers not logged into the website or mobile applications, the branch selector may be provided so that the customers can select a branch by location and choose an appointment time using the branch's generic calendar.

Once an appointment is scheduled, the digital branch system may generate reminders. Reminders enable customers to opt into receiving appointment reminders, such as text message, SMS, or email reminders. The email reminders may include an .ics or .vcf files so that customers can add items both their personal calendars and to their contacts.

Managers using the digital branch appointment system may be enabled to view appointments scheduled to the generic branch calendar so they can assign the appointments to branch employees. Furthermore, the digital branch system accepts modifications and cancellations of appointments from customers and adjusts the calendar accordingly so that reminders are no longer generated and assignment of bankers is no longer necessary. The appointment within the calendar entry may include: customer name; Electronic Calendar Interface (ECI) if logged in. reason for appointment, customer contact information, and any additional notes entered by the customer.

Thus, both customers and non-customers can access the functionality to schedule appointments. For example, non-customers may access the appointment functionality to schedule an appointment to open an account. Customers may securely log in to the digital branch system and schedule appointments with their personal bankers or may select open time slots to meet with any other banker at a branch.

Figure 9A:
FIGS. 9A and 9B are user interfaces illustrating a method for reading branch reviews in accordance with embodiments of the invention.
Figure 9B:
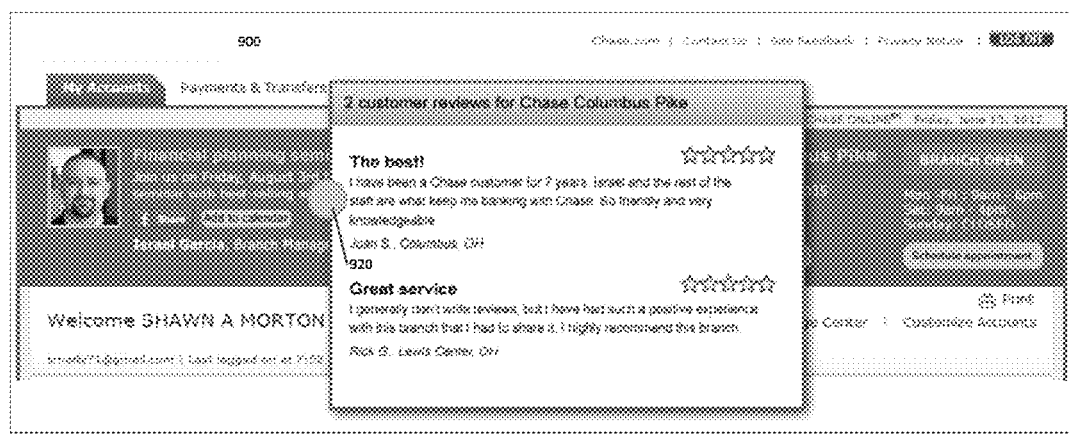

FIGS. 9A and 9B are user interfaces illustrating a method for reading branch reviews in accordance with embodiments of the invention. An interface 900 in FIG. 9A may include a link 910 for reading reviews within the branch information section. FIG. 9B illustrates the activated link 920 that shows the reviews of the branch posted by fellow customers.

Figure 10A:
FIGS. 10A-10C are user interfaces illustrating a method for writing branch reviews in accordance with an embodiment of the invention.
Figure 10B:
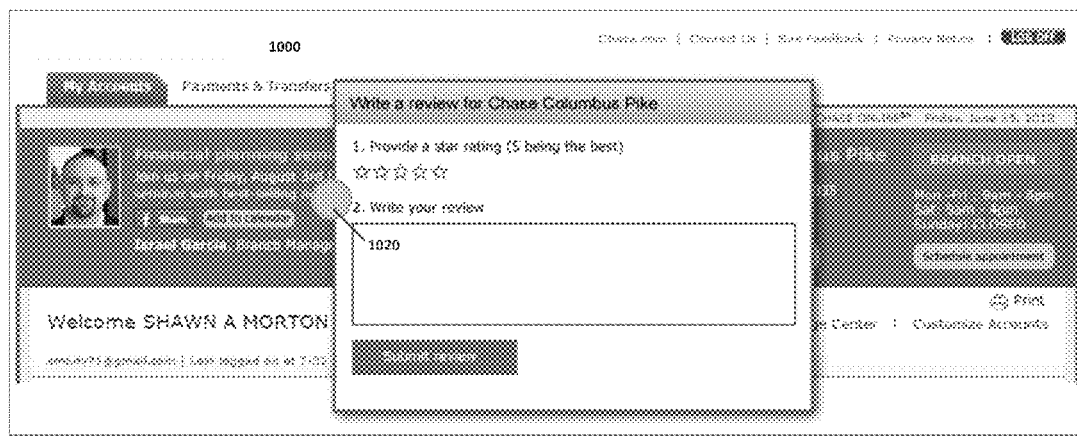
Figure 10C:
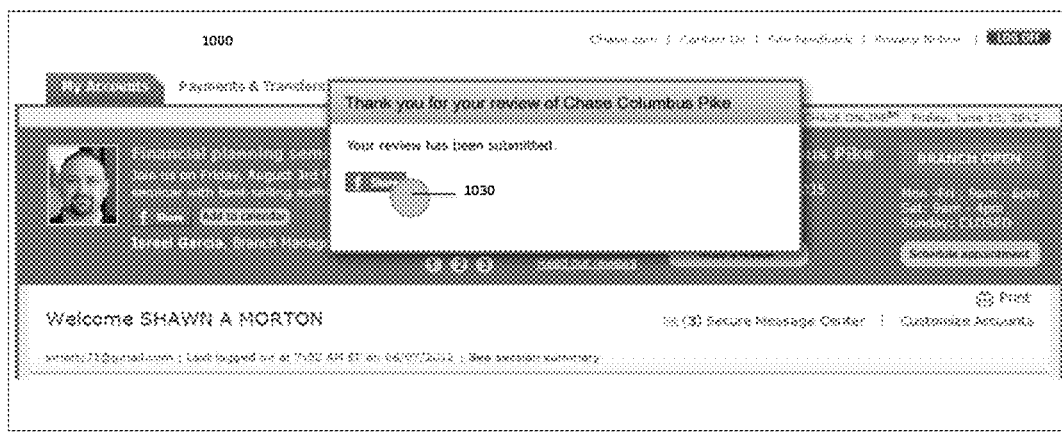

FIGS. 10A-10C are user interfaces illustrating a method for writing branch reviews in accordance with an embodiment of the invention. A user interface 1000 may include a selectable "write a review" link 1010. FIG. 10B illustrates a review writing interface 1020 that appears upon selection of the link 1010. Through the interface 1020, the user is able to complete the review submission form. Upon submission, the customer may be provided with an interface 1030 as shown in FIG. 10C. The interface 1030 may include an option to share the review to Facebook or other social media pages from the confirmation page.

Figure 11A:
FIGS. 11A and 11B are user interfaces illustrated a method for social media sharing in accordance with an embodiment of the invention.
Figure 11B:
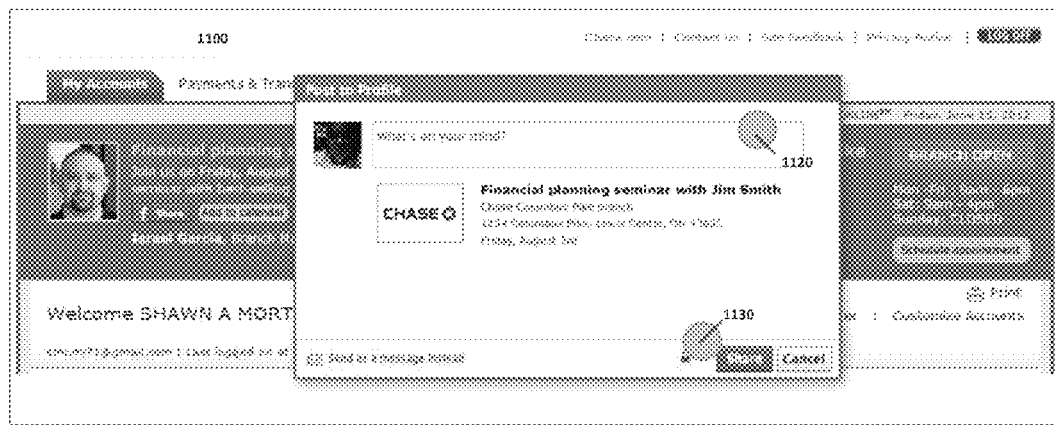

FIGS. 11A and 11B are user interfaces illustrating a method for social media sharing in accordance with an embodiment of the invention. FIG. 11A illustrates an interface 1100 including a selectable share button 1110 under the branch update. FIG. 11B provides further sharing functionality. Once the customer has selected the share button 1110, the customer may be permitted to add more context using area 1120. Thereafter, the customer may again select a share option 1130 to post the update to a social media site, such as for example, a Facebook Timeline.

Figure 12:
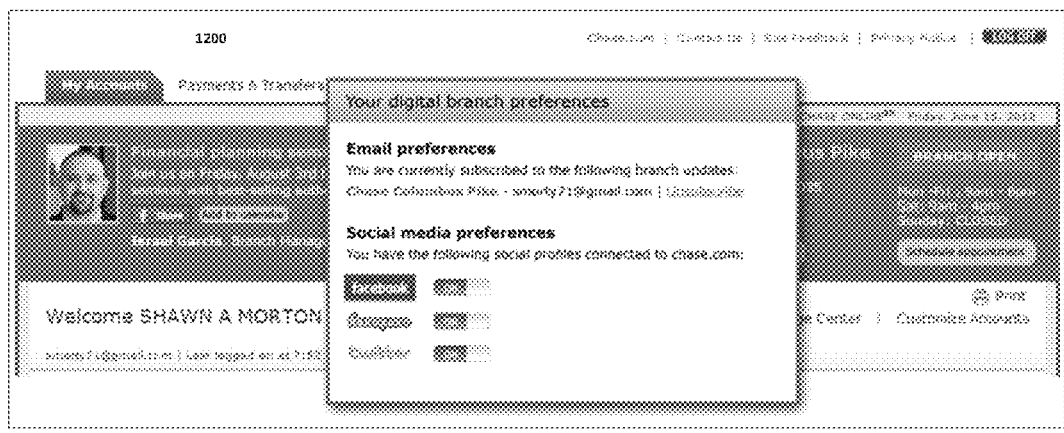
FIG. 12 is a user interface illustrating a method for specifying digital branch preferences in accordance with embodiments of the invention.

FIG. 12 is a user interface 1200 illustrating a method for specifying digital branch preferences in accordance with embodiments of the invention. The user interface 1200 is provided to display digital branch preferences. Upon viewing this interface, customers will be better able to manage their email subscription and social media preferences. As illustrated, a customer can either unsubscribe from email updates or may change the email address designated. In additional embodiments, the customer may request text updates and add or change a phone number. Social media sites may be turned on or off as they relate to the digital branch system. In other embodiments, various features of each social media system may be activated or deactivated individually.

All of the aforementioned data may be centrally stored on the digital branch system. Accordingly, the customer does not become reliant on a particular computing device or mobile device and is able to access data from the "cloud."

It will be readily understood by those persons skilled in the art that the present invention is susceptible to broad utility and application. Many embodiments and adaptations of the present invention other than those herein described, as well as many variations, modifications and equivalent arrangements, will be apparent from or reasonably suggested by the present invention and foregoing description thereof, without departing from the substance or scope of the invention.

Accordingly, while the present invention has been described here in detail in relation to its exemplary embodiments, it is to be understood that this disclosure is only illustrative and exemplary of the present invention and is made to provide an enabling disclosure of the invention. Accordingly, the foregoing disclosure is not intended to be construed or to limit the present invention or otherwise to exclude any other such embodiments, adaptations, variations, modifications and equivalent arrangements.

While particular embodiments of the invention have been illustrated and described in detail herein, it should be understood that various changes and modifications might be made to the invention without departing from the scope and intent of the invention.

From the foregoing it will be seen that this invention is one well adapted to attain all the ends and objects set forth above, together with other advantages, which are obvious and inherent to the system and method. It will be understood that certain features and sub-combinations are of utility and may be employed without reference to other features and sub-combinations. This is contemplated and within the scope of the disclosed invention.

The invention claimed is:

1. A digital bank branch system for associating a customer communicating over a network with a banking host computing system with a physical bank branch, the digital bank branch system comprising:
   at least one computer memory at the banking host computing system storing customer information and instructions; and
   at least one computer processor at the banking host computing system accessing and executing the stored instructions to perform steps including:
      providing a bank web site from the bank host computing system accessible to mobile user devices over the Internet, the bank web site offering customers a selection interface enabling changing of a default bank branch by selecting as a local bank branch at least one physical bank branch from multiple selectable physical bank branches;
      providing each customer with a selectable link to a digital branch web page connecting each customer with the selected local bank branch, the selectable link accessible from a customer accounts page of the bank web site provided by the host banking computing system;
      providing a local branch information area at the digital branch web page, the local branch information area accessible over the Internet including information relevant to the selected local bank branch including at least one of images of local bank branch personnel and biographical information of local bank branch personnel;
      implementing an alert generator for generating alerts relevant to the selected local bank branch for delivery over a distribution channel;
      selecting the distribution channel for distribution of the alerts relevant to the selected local bank branch from a plurality of available channels based on a determination from a customer monitor that the customer is using a particular mobile user device for communicating with the bank host system over the Internet, the available channels including at least email, text message, and social media channels; and
      distributing the alerts over the selected channel to the mobile user device.

2. The system of claim 1, further comprising providing an appointment scheduling interface on the digital branch web page allowing the customers to select an appointment time and a preferred banker.

3. The system of claim 2, wherein the scheduled appointments are video appointments.

4. The system of claim 1, wherein the steps additionally include providing a social media sharing option on the digital branch web page allowing customers to share information displayed through the digital branch system on social media systems.

5. The system of claim 1, further comprising locating a customer based on at least one of an IP address, GPS technology and point of purchase data.

6. The system of claim 5, further comprising providing offers to the located customer through the selected channel based on the customer location.

7. The system of claim 1, further comprising monitoring customer purchasing behavior and storing the captured data for offer generation.

8. The system of claim 1, wherein the information includes photos and profiles of bankers and branch employees.

9. The system of claim 1, wherein the information additionally includes address, phone number, branch hours, and open or closed status of the local bank branch.

10. The system of claim 1, further comprising an image capturing device showing the local bank branch in real time.

11. The system of claim 1, wherein the selection interface for allowing each customer to select multiple local branches allows selection of times for displaying relevant branch information when multiple local branches are selected.

12. The system of claim 1, further comprising providing an interface facilitating customer review of the local bank branches.

13. The system of claim 1, further comprising providing an interface allowing the customer to change the selected local bank branch.

14. The system of claim 1, further comprising providing an interface allowing each customer to search for a corresponding local bank branch.

15. A digital bank branch method for associating a customer communicating over a network with a banking host computing system with a physical bank branch, the digital bank branch method comprising:
storing, in at least one computer memory at the banking host computing system, customer information and instructions; and
accessing and executing the stored instructions using at least one computer processor at the banking host computing system to perform steps including:
providing a bank web site from the bank host computing system accessible to mobile user devices over the Internet, the bank web site offering customers a selection interface enabling changing of a default bank branch by selecting as a local bank branch at least one physical bank branch from multiple selectable physical bank branches;
providing each customer with a selectable link to a digital branch web page connecting each customer with the selected local bank branch, the selectable link accessible from a customer accounts page of the bank web site provided by the banking host computing system;
providing a local branch information area at the digital branch web page, the local branch information area accessible over the Internet including information relevant to the selected local bank branch including at least one of images of local bank branch personnel and biographical information of local bank branch personnel;
implementing an alert generator for generating alerts relevant to the selected local bank branch for delivery over a distribution channel;
selecting the distribution channel for distribution of the alerts relevant to the selected local bank branch from a plurality of available channels based on a determination from a customer monitor that the customer is using a particular mobile user device for communicating with the bank host system over the Internet, the available channels including at least email, text message, and social media channels; and
distributing the alerts over the selected channel to the mobile user device.

16. The method of claim 15, further comprising providing an appointment scheduling interface on the digital branch web page allowing the customers to select an appointment time and a preferred banker.

17. The method of claim 16, wherein the scheduled appointments are video appointments.

18. The method of claim 15, wherein the steps additionally include providing a social media sharing option on the digital branch web page allowing customers to share information displayed through the digital branch system on social media systems.

19. The system of claim 15, further comprising locating a customer based on at least one of an IP address, GPS technology and point of purchase data.

20. The method of claim 19, further comprising providing offers to the located customer through the selected channel based on the customer location.

21. The method of claim 15, further comprising monitoring customer purchasing behavior and storing the captured data for offer generation.

22. The method of claim 15, wherein the information includes photos and profiles of bankers and branch employees.

23. The method of claim 15, wherein the information additionally includes address, phone number, branch hours, and open or closed status of the local bank branch.

24. The method of claim 15, further comprising an image capturing device showing the local bank branch in real time.

25. The method of claim 15, wherein the a selection interface for allowing each customer to select multiple local branches allows selection of times for displaying relevant branch information when multiple local branches are selected.

26. The method of claim 15, further comprising providing an interface facilitating customer review of the local bank branches.

27. The method of claim 15, further comprising providing an interface allowing the customer to change the selected local bank branch.

28. The method of claim 15, further comprising providing an interface allowing each customer to search for a corresponding local bank branch.

* * * * *